Jan. 10, 1956     R. B. JOHNSON     2,730,040
HIGH SPEED MULTIPLE CHARACTER WIRE PRINTER
Filed Nov. 8, 1951     12 Sheets-Sheet 1

FIG. 1

INVENTOR
REYNOLD B. JOHNSON
BY Robert S. Dunham
ATTORNEY

Jan. 10, 1956    R. B. JOHNSON    2,730,040
HIGH SPEED MULTIPLE CHARACTER WIRE PRINTER
Filed Nov. 8, 1951    12 Sheets-Sheet 6

INVENTOR
REYNOLD B. JOHNSON
BY Robert S. Dunlam
ATTORNEY

Jan. 10, 1956 R. B. JOHNSON 2,730,040
HIGH SPEED MULTIPLE CHARACTER WIRE PRINTER
Filed Nov. 8, 1951 12 Sheets-Sheet 8

INVENTOR
REYNOLD B. JOHNSON
BY Robert S. Dunham
ATTORNEY

Jan. 10, 1956     R. B. JOHNSON     2,730,040
HIGH SPEED MULTIPLE CHARACTER WIRE PRINTER
Filed Nov. 8, 1951     12 Sheets-Sheet 11

INVENTOR
REYNOLD B. JOHNSON
BY *Robert S. Dunlam*
ATTORNEY

Jan. 10, 1956 R. B. JOHNSON 2,730,040
HIGH SPEED MULTIPLE CHARACTER WIRE PRINTER
Filed Nov. 8, 1951 12 Sheets-Sheet 12

FIG. 15

Inventor
REYNOLD B. JOHNSON
By Robert S. Dunham
Attorney

United States Patent Office

2,730,040
Patented Jan. 10, 1956

2,730,040

HIGH SPEED MULTIPLE CHARACTER WIRE PRINTER

Reynold B. Johnson, Binghamton, N. Y., assignor to International Business Machines Corporation, New York, N. Y., a corporation of New York Application November 8, 1951, Serial No. 255,391

16 Claims. (Cl. 101—93)

This invention relates to a printing machine. In particular it relates to a wire printer, i. e. a machine in which selected wires of one or more clusters of such wires are differentially positioned in a longitudinal direction to form at the face of the cluster, or clusters, the desired character printing surfaces.

It is a principal object of the invention to provide a high speed wire printing machine in which the printing impression, whether of a single character or a plurality of aligned simultaneously imprinted characters, is of uniformly good quality.

Another object of the invention is the provision of a wire printer of the class described which is capable of printing an entire line of text at each printing stroke.

Other objects of the invention concern the structure and arrangement of parts that make possible high quality printing and the instantaneous printing of an entire line of characters at a high rate of speed.

Printing by means of wire ends adjusted to form printing surfaces has been suggested heretofore. The prior art devices, however, have been subject to certain disadvantages which are eliminated by this invention. The prior art printers of this class involve the use of printing wire setting devices against which one end of the wire rested or with which the wires were otherwise positively engaged during the printing stroke. It was, therefore, a common characteristic of these printers that the printing wires are held against longitudinal movement during the printing operation. This fact led to poor quality printing because it presupposed that all the printing wires had exactly the same effective length and that all the wires to form a printing character could be moved into the same printing plane by their individual control devices. These conditions are theoretically possible, but they have not been achieved in practice. This invention overcomes the aforesaid difficulties by providing for the controlled longitudinal movement of printing wires under impact of the printing stroke, whereby the force of the printing stroke is itself effective, so to speak, to align the printing ends of character forming wires in the common printing plane. This feature of the invention renders unimportant slight longitudinal misalignment of the printing ends of the wires during the setting operation.

The prior art wire printers have, almost without exception, required wire setting mechanism that is much wider than the width of the letter position under its control. This fact inhibited the use of such devices for multiple letter or line printing in that the number of character positions required for line printing could not be arranged in the space provided by a printing line without resort to unwieldly mechanical structures.

The present invention in this respect avoids the disadvantages of the prior art by providing printing wires therein extending from a cluster at a common printing zone to a position of alignment remote from the printing zone where they are controlled by an elongated control member which has a diameter that is no greater than the width of a character forming wire cluster at the printing zone.

Further objects and advantages of the invention will be pointed out and others will be evident from a reading of the detailed description of the invention in light of the drawings forming a part of this application, and in which drawings.

Figure 1:
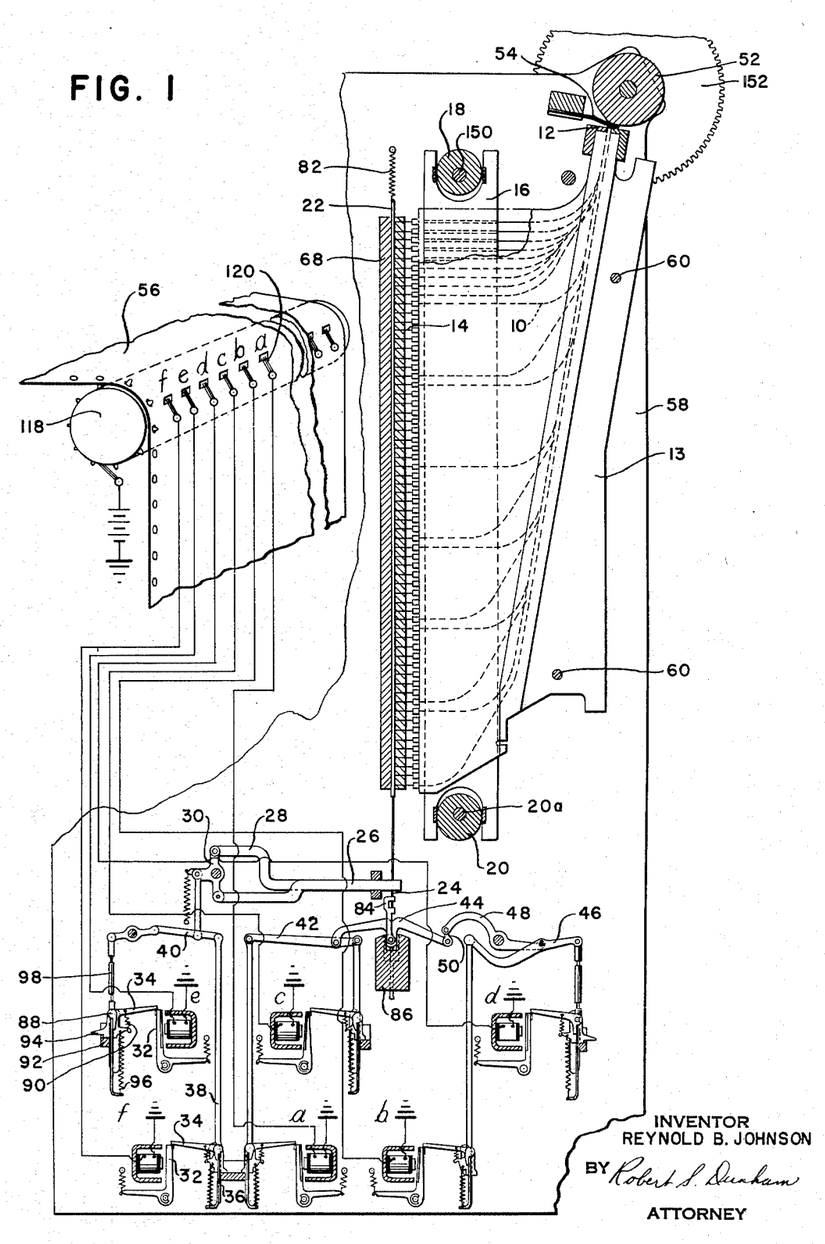
Fig. 1 is a somewhat diagrammatic, longitudinal section through a printer that embodies the features of the invention. This view illustrates a printing wire assembly and the wire setting control means for a single character position.

Before engaging in a detailed discussion of the mechanism constituting the invention and the modifications thereof, it may be appropriate to give a brief preliminary description of the principle of operation of the wire printer herein and such description will follow in reference to Fig. 1 of the drawing.

This printing mechanism forms characters from a closely spaced pattern of dots, each dot being printed by pressing the end of a wire 10 against a ribbon adjacent a paper record sheet. Herein the diameter of each wire is very small, for example .009 of an inch. A generally rectangular cluster of sixty-three wires is used at each printing station. Each cluster has its wires arranged in nine vertical rows of seven wires each. In forming a character to be printed various combinations of wires are moved outwardly a short distance so that their ends protrude slightly beyond the face of the cluster at the printing zone. Such protruding wires may be made to represent the desired characters. Thus the presentation of a character at the printing line is accomplished by a relatively small movement of a multiplicity of small elements rather than by a relatively larger movement of a single element such as a type bar.

Formation of the wire pattern at the printing zone involves the proper selection of the wires to be projected in character outline. The sixty-three wires form the rectangular cluster at a printing position 12, and from the cluster the wires are fanned out in a series of guides in a wire guide assembly 13 to form a single line of wires at relatively large spacing at the other or control end 14. The control end 14 of the printing wires slides in a wire control bail 16. The bail 16 is reciprocated by two eccentrics 18 and 20 and alternately pushes and pulls the printing wires in the guide assembly 13, causing the printing ends of the wires to move toward the paper and return during each printing cycle. In the absence of other controls, however, the group of wires so moved does not form a character printing face nor does it move far enough to cause a printing impression.

Adjacent the control ends 14 of the wires is a code rod 22 which has a diameter in the neighborhood of .093 of an inch, there being one such rod and associated control mechanism per printing position. A pattern of notches is cut transversely across each of four sides of the control rod 22. Thus, by rotating the code rod in increments of 90°, four individual groups of notches can be presented to the control ends 14 of the printing wires. If the bail 16 is raised by the eccentrics 18 and 20, or if the code rod 22 is moved into contact with the control ends of the printing wires 10, it is now seen that the code rod 22 will have no effect on a given printing wire if the wire enters a notch in the code rod. If, however, the control end of a wire strikes a high portion of the code rod 22, the wire will be forced deeper into the wire guide assembly 13 and will protrude above the general level of the cluster face.

It may be stated that in order to set a given printing wire for any one of forty-eight different characters it is necessary to present forty-eight different sections of the code rod 22 to the control end of each wire. Since it has been shown that the code rod may be rotated to four different positions, it now follows that the forty-eight positions may be obtained by shifting the rod longitudinally to each of twelve index positions.

The diameter of the control end of the wires and the width of the notches in the control bar 22 are such that an incremental movement of .020 of an inch, for example, is sufficient to shift from one notch space to the next, so that the translatory motion of the code rod is eleven times .020 or .220. The code rod returns to an intermediate home position during each printing cycle, so that the maximum movement of the rod longitudinally never exceeds .120 inch and return. Similarly, the rotary movement of the code rod 20 is made in either direction from an intermediate home position, and does not exceed 180° and return in any given printing cycle.

One end of the code rod 22 has a pinion 24 thereon engaged by a pair of racks 26 and 28, the racks 26 and 28 being operably connected to a bell-crank 30. A pair of magnets $e$ and $f$ control a differential adding linkage which, through the bell crank 30 and the racks 26 and 28, position the code bar 22 into one of its four rotary index positions. Magnet $f$, for example, attacks an armature 32 which unlatches an interposer 34, permitting a bail 36 to move a link 38 upwardly. This action alone rocks the bell-crank 30 to move the racks 26 and 28 a distance of .156 inch, which in turn rotates the code bar 22 through 180°. In a similar manner, magnet $e$ causes a rack movement of .078 inch or 90° in one direction from its home position. When magnets $e$ and $f$ are both energized, a lever 40 adds the two opposing motions algebraically to impart a movement of .078 inch to the racks to rotate the code bar 90° in the opposite direction from its home position. In this fashion the combinational energization of magnets $e$ and $f$ will cause the code bar to be positioned in any of its four rotary index positions.

Indexing of the code bar 22 into any of its twelve longitudinal positions is accomplished in a similar manner by four magnets $a$, $b$, $c$ and $d$ and three differential adding levers 42, 44 and 46. Magnets $a$ and $c$ when impulsed cause movement of the ends of the adding lever 42. The lever 42 is unequally divided by its connection with the lever 44 so that the movement at that point is different under control of magnets $a$ and $c$ separately and in combination. Similarly magnets $b$ and $d$ control movement of the ends of lever 46. Lever 46 is unequally proportioned so that the movement of the inner end is .080 inch under control of magnet $b$ alone, .160 inch under control of magnet $d$ alone, and .240 inch under control of magnets $b$ and $d$ jointly. A reversing lever 48 is provided, together with a link 50 which applies these increments of movement to one end of the adding lever 44 which is connected to the code bar 22. Since the code bar is connected to the center of lever 44, movement of the code bar will be equal to the algebraic sum of the motions of the end of the lever divided by two. An examination of the displacements available from the three different movements available at each end of the lever 44 will show that the four magnets $a$, $b$, $c$ and $d$ can produce movement of the code bar 22 in eleven increments of .020 inch over a total distance of .220 inch, there being .100 inch code bar movement to one side of its home position, and .120 inch movement to the other side of its home position.

The bail 16 (or as an alternative, movement of the code bar 22) sets up the printing wires by means of the control bar up to 180° of the printing cycle, at which time the pattern of wires will be set to represent the desired character. At about 180° of the printing cycle, a printing cam 52 presses a leaf spring bail 54 against a recording paper, causing an impression to be formed. The set-up movement of the six code bar set-up bails 36 occurs entirely during the latter half of the printing cycle. The wire set-up bail 16 moves to its displaced position in 90° of the cycle and returns to its home position in a similar time interval. The impulse time for the selector magnets $a$ through $f$ may occur during the first half of the cycle. Reading time of a control record 56 may be throughout almost an entire printing cycle preceding the selector magnet impulse time. When the bails 36 have moved to a displaced position during 90° of the cycle, carrying with them the selected interposers and thereby positioning the code rod 22, the printing wire set-up bail 16 completes set-up of the printing wires during the succeeding 180° of the cycle by pressing the control end 14 of wires 10 and the control rod together as described above. During the next 90° of the cycle, the set-up bails 36 and all associated mechanism including the code rod 22 return to home position.

With the foregoing general description in mind we may now turn to a detailed consideration of the mechanism and the modifications thereof.

The wire guide 13 comprises an assembly that is fixed in the side plates 58 of the printing mechanism by means of locating studs 60. The guide means has therein channels through which the printing wires 10 are guided for substantially free longitudinal movement in respect to each other. In a convenient form the guide assembly 13 may be comprised of a pair of thin but rigid plates providing between them individual guide channels for the printing wires 10. By reference to Fig. 1 of the drawing it will be seen that the respective wire guide channels of the guide member 13 terminate at a common printing position 12 where the wires are held in a cluster as described hereinabove. From the common printing position, the guide channels fan out into an aligned, single plane position at the remote edge of the guide member 13. A printing wire 10 is positioned in each of the guide channels of the guide member 13, and each wire is of the proper length to permit the end thereof at the printing position 12 to lie in a common plane while the opposite ends of the wires lie in an aligned single line with their control ends 14 protruding from the guide member 13 so that they may be brought into contact with the code bar 22 for differentially positioning the wires in a longitudinal direction to form the outline of selected characters. Each guide member 13 has associated therewith a bail 16. In one form of the invention, i. e. that illustrated in Fig. 1 and Figs. 2a through 2d, the bail 16 constitutes a friction bail which is adapted to move the wires both toward and away from the printing position 12. In another form of the invention, i. e. that illustrated in Figs. 3a through 3c and in Fig. 4, the bail 16a is effective to move a wire restoring bail as well as the code rods 22 in relation to the wires as will be pointed out more particularly in connection with said figures of the drawing.

With particular reference to Figs. 2a through 2d of the drawings, it will be seen that the bail 16 has therein a plurality of friction passages 62. These passages are equal in number to the printing wires of a printing guide assembly 13, and they are adapted to frictionally control a friction wire 64 attached to an associated printing wire 10. Thus a friction wire 64 is attached to each of the printing wires 10 at the protruding or control ends of the printing wires. Each attachment is preferably made by means of a joint or collar 66 which at the same time may serve the function of a wire control or positioning means. In this arrangement of the printing wires, the collars 66 are adapted to cooperate with the remote edge of the fixed wire guide 13 for resetting all of the wires at the end of the printing cycle. As to this form of the invention, the collars 66 may be regarded as having a weight that is negligible insofar as its effect on the free movement of the printing wires is concerned.

As stated hereinabove, the bail 16 is oscillated by means of the eccentrics 18 and 20 for the purpose of moving the protruding control ends of the wires 10 into contact with the adjustable code bar 22 mounted for rotary and longitudinal movement in a fixed guide housing 68.

Figure 2A:
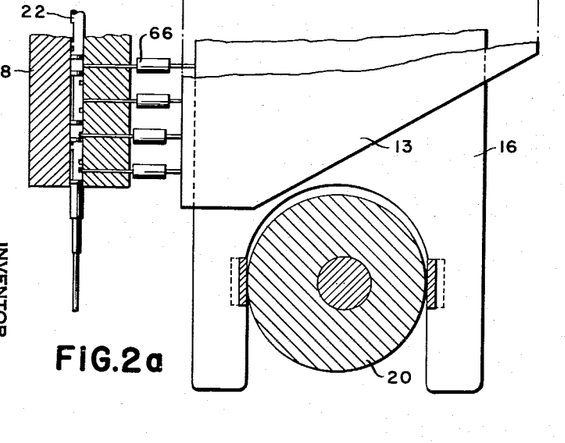
Figs. 2a, 2b, 2c and 2d illustrate four successive positions of wire setting control mechanism during a printing cycle.
Figure 2B:
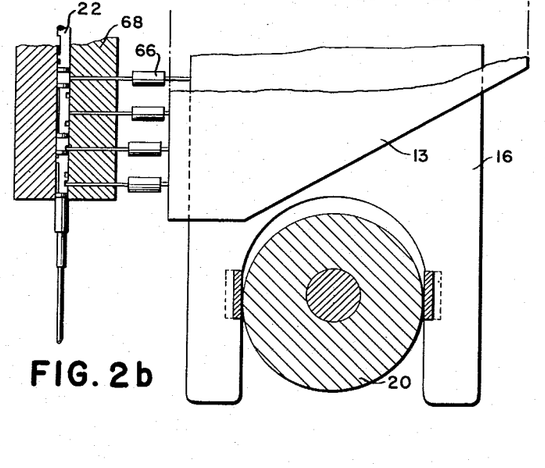
Figure 2C:
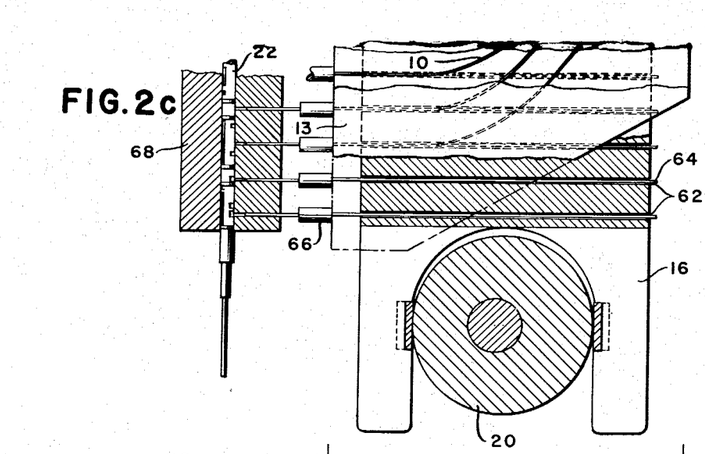
Figure 2D:
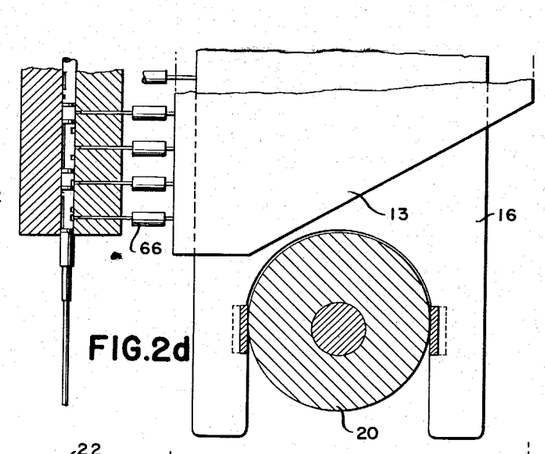

Fig. 2a of the drawings shows the position of the bail at 90° of the printing cycle, Fig. 2b shows the position of the bail 16 at 180° of the printing cycle, Fig. 2c shows the bail 16 at 270° of the printing cycle, and Fig. 2d shows the bail 16 at 360° of the printing cycle. By reference to these figures of the drawings, it will be seen in Fig. 2a that the control ends of the printing wires have been moved into contact with the code bar 22. The first two wires from below in that figure have entered a notch in the code bar while the upper two wires have encountered the higher control bar surface. As a result of this, the two groups of wires are differentially adjusted in a longitudinal direction. With this code bar adjustment of the wires, the two upper wires will be projected from the face of the wire cluster at the printing position 12, and all of the wires will be moved forward equally when the bail 16 recedes from the code bar housing 68. By reference to Fig. 2b of the drawings which shows the position of the bail 16 at 180° of the printing cycle, it will be seen that the set-up wires have been withdrawn from contact with the code bar which is the position of the parts at the instant before printing impact. As intimated in the introductory portions of the specification, it is a principal object of the invention to support the printing wires for controlled relative longitudinal movement under impact of the printing stroke. The withdrawal of the control ends of the printing wires from contact with the code bar 22 at the instant before printing impact conditions the printing wires for longitudinal movement at the time of printing impact. This in effect utilizes the impact of the printing stroke to position all of the printing wires in a common plane at some time during the printing stroke.

In Fig. 2c of the drawings which represents the position of the bail 16 and its associated wires at 270° of the printing cycle, the set-up bail 16 has receded from the remote edge of the guide assembly 13 to normalize the collars 66 against the edge of the guide assembly 13.

In Fig. 2d the parts are shown at 360° of the cycle and herein the set-up bail 16 is in its return stroke wherein it carries the stop collars 66 away from the remote stop edge of the guide assembly 13 to condition the mechanism for resetting of the wires at 90° of the cycle.

The frictional contact between the friction wires 64 and their associated friction passages 62 in the wire control bail 16 is sufficient to cause movement of the printing wires in both directions of longitudinal movement unless such wires are otherwise retarded as by contact with the code bar 22 or by contact of the stop collars 66 with the fixed stop edge of the guide assembly 13.

Figure 3A:
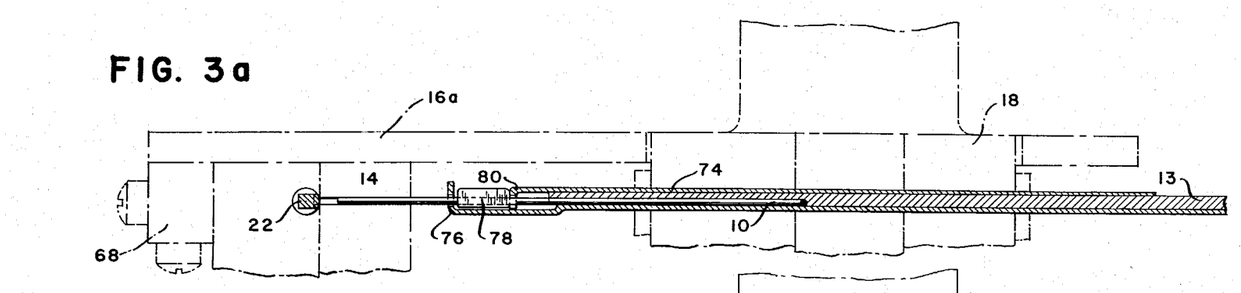
Figs. 3a, 3b and 3c illustrate three successive positions of modified wire setting control mechanism during a printing cycle, these views being of the mechanism on line 3—3 of Fig. 4.
Figure 3B:
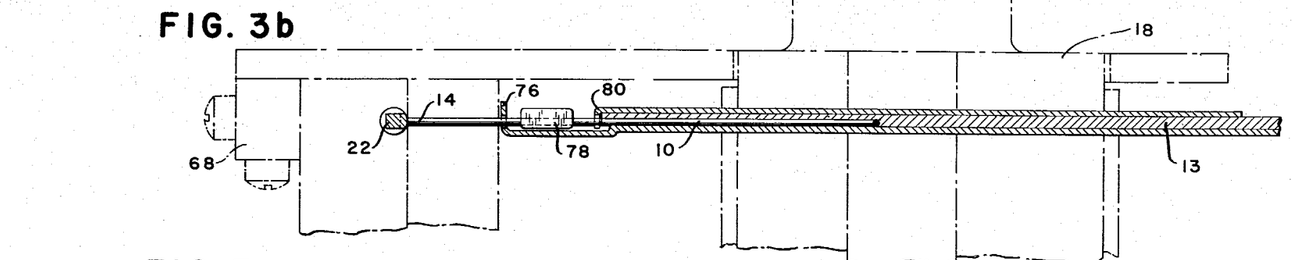
Figure 3C:
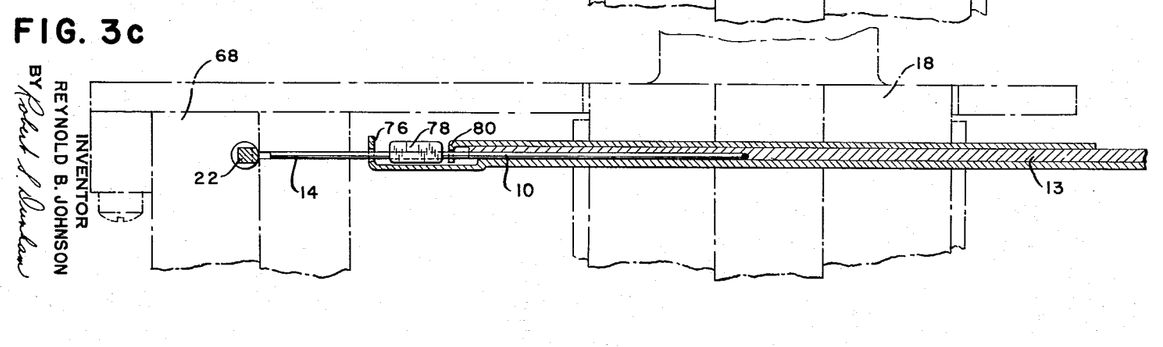
Figure 4:
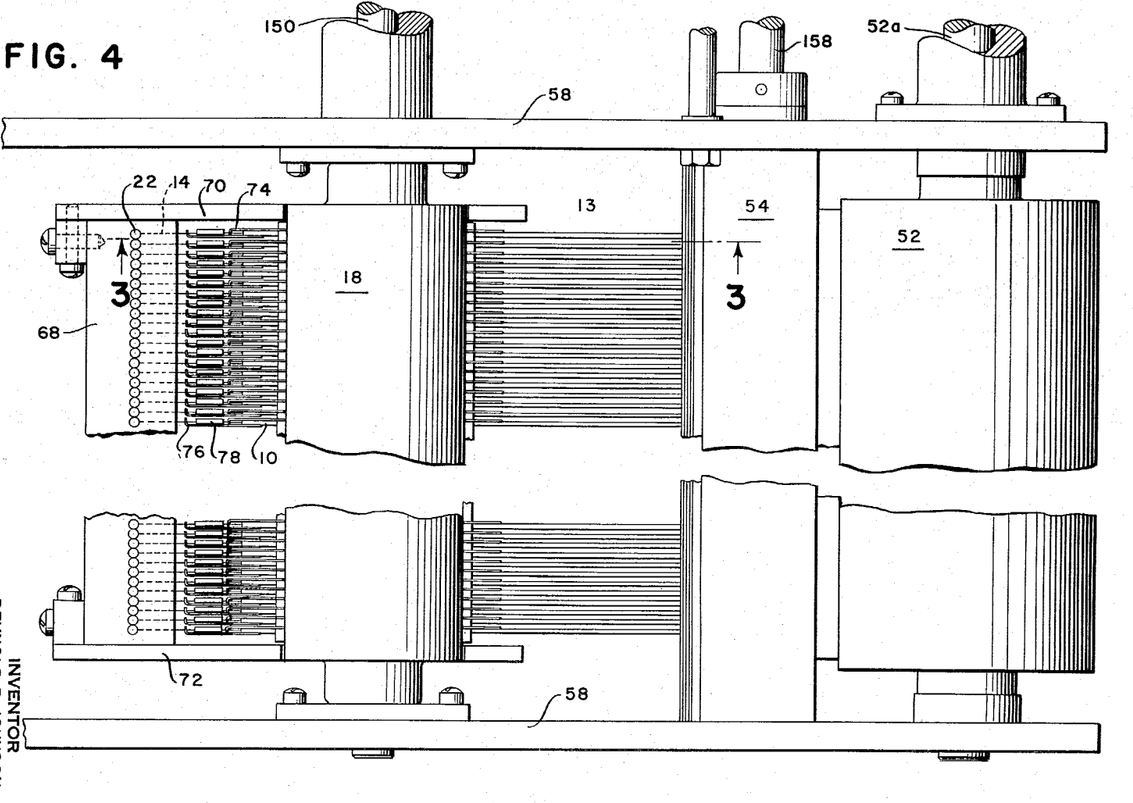
Fig. 4 is a plan view of a wire printer having therein the wire setting control device of Figs. 3a, 3b and 3c.

In a modified form of the structure shown in Figs. 3a, 3b, 3c and in Fig. 4, the eccentrics 18 and 20 (not shown) control the joint movement of a wire restoring bail and a code bar housing. Two forms of the mechanism have been illustrated herein to demonstrate that the position of the printing wires may be controlled simply by moving the control ends of the printing wires into contact with a relative fixed code bar as in the form described immediately hereinbefore or by moving the code bar into contact with the relatively stationary control ends of the printing wires. This latter form of mechanism will now be described. In Fig. 4 the code bar guide housing 68 is mounted in a frame which has a pair of forwardly projecting plates 70 and 72, apertured at their free edge for driving association with the eccentrics 18 and 20. The eccentrics 18 and 20 are adapted to move the code bars 22 into and out of contact with the control ends 14 of the printing wires. Mounted on the eccentrics 18 and 20 for reciprocating movement under the influence of the eccentrics during their rotation is a wire restoring bail 74.

By reference to Figs. 3a through 3c of the drawings, it will be seen that the wire guide assembly 13 has fixed thereto a flanged safety stop 76 through which the control end 14 of the printing wires 10 pass and against which a wire carried weight 78 is adapted to abut in case of over adjustment of the related printing wire in a direction toward the code rod 22. The restoring bail 74 has an inturned flange 80 through which the control end 14 of the printing wire passes and which is adapted to engage the weight 78 during restoring movement for restoring the wire to a normal position.

Whereas the movement of the printing wires in Figs. 2a through 2d is controlled by the friction wires 64, the restoring action in the form of the invention shown in Figs. 3a through 3c is under the positive influence of the restoring bail 80. In the latter form of the invention as well as in the one previously described, the printing wires are mounted in the guide assembly 13 for relatively free longitudinal movement. In the first form of the invention such movement was limited and stabilized by means of the friction wires 64. In the form of the invention shown in Figs. 3a through 3c, the longitudinal movement of the printing wires is limited and stabilized by the weights 78. In this latter arrangement, the weight 78 in effect constitutes an inertia device which may be overcome by impact of the printing stroke for normalizing the projecting ends of a formed character in a common printing plane at the printing position 12 during the printing stroke.

It was stated in the foregoing paragraph that the printing wires 10 of the control mechanism shown in Figs. 3a through 3c, are relatively free to move longitudinally under impact of the printing stroke. An examination of Figs. 3a, 3b and 3c will show why this is true. Fig. 3a shows the position of the parts at 270° of the printing cycle which may be considered as the restored position. At this point of the cycle the eccentrics 18 and 20 have rotated to carry the housing 68 and consequently the code bars 22 out of contact with the control end 14 of the printing wire 10. It will be noted by reference to Fig. 3a that this position of the wire end 14 has been achieved by movement of the restoring bail 74 under influence of the eccentrics 18 and 20, the inturned flange 80 of the restoring bail having engaged the wire attached weight 78 and moved it into proximity with the flange of the fixed safety stop 76.

At approximately 90° of the cycle, the parts will have assumed the position shown in Fig. 3b of the drawings which may be considered as the set-up position. Herein the eccentrics 18 and 20 have carried the restoring bail 74 forwardly (to the right in the drawing) and out of contact with the weight 78. At the same time the eccentrics 18 and 20 have moved the housing 68 forwardly so that the code bar 22 will come into contact with the wire ends 14, thus setting the wires in selected character printing position.

Fig. 3c represents the position of the parts at approximately 180° of the cycle in which the eccentrics 18 and 20 have moved the housing 68 and consequently the code bar 22 rearwardly (to the left in the drawing) so that none of the wire ends 14 are in contact with the code bar. This is the position of the parts at the instant preceding printing impact.

It will be seen that the foregoing structures provide means for confining a cluster of wires at one end thereof to a letter printing area; they provide a wire guide member to a support printing wires therein for free longitudinal movement relative to each other and they provide printing wires in the guide member. It is seen that in both forms of the control mechanism the wires terminate at one end in a plane at the confining means to constitute a printing face and at the other end thereof in a plane constituting a wire setting zone. In combination with the foregoing, each form of control mechanism provides a wire setting device in the wire setting zone. Each form provides means for moving the setting device and the wire ends at the wire setting zone into contact with each other for differentially adjusting the longitudinal position of selected wires to form a printing character at the printing face. Finally and of great importance, both functions of the control mechanism provide means for separating the wire setting device and the control ends of the wires after selected wires have been set to form a letter but before the printing stroke, thereby freeing the printing wires for longitudinal movement under impact at the printing face thereof. Each form of the mechanism hereinabove described has in common means thereafter operated to print by impact from a printing face so set up.

It may be helpful to describe in somewhat more detail the nature of the code bar mechanism and its control instrumentalities. Whether the code bar is mounted in a fixed housing, as in the first example given, or whether it is mounted for movement under influence of the eccentrics 18 and 20, as in the second example given, each individual code bar 22 is biased to a normal position by means of a spring 82. The spring 82 permits lateral movement of the code bar as well as the necessary rotary and longitudinal movement during adjustment into a given wire setting position.

It has been pointed out heretofore that an electromechanical system, including differential levers and control magnets, has been provided for adjusting the code bar to one of its four rotative positions and for adjusting the code bar longitudinally to any one of its eleven longitudinal positions (the home or normal position of the code bar constituting a twelfth position). The adjusting system has been referred to previously hereinabove, and we shall seize this opportunity to describe the mechanism in somewhat greater detail.

The electromagnets e and f, as previously stated, control the angular position of the code bar by rotating the code bar into one of four positions of adjustment. Such angular adjustment is imparted to the code bar through the pinion 24 which is moved in the proper increments by means of the racks 26 and 28. At this point it may be noted that the control end of the code bar 22 is mounted for rotary movement in a socket 84 which socket is attached to the adding lever 44. The socket 84 is guided for longitudinal movement in a guide block 86.

Magnets a through f each has associated therewith an armature 32 which is pivoted for rocking movement, and each armature is spring-biased into a position away from the core of its magnet. Each of the armatures 32 constitutes a latch for the interposers 34, whereby when the magnets are energized and the armatures 32 are attracted to the cores thereof, the armatures 32 are withdrawn from blocking contact with the interposers 34. Each interposer is pivoted to a link through which operating motion is transmitted from the bails 36. In this respect it may be noted that the interposers are generally L-shaped, one leg 88 of the interposers extending downwardly where they may be engaged by the bails 36 when the interposers are released by energization of their related magnets. Upon release of an interposer the same will rock about the point at which it is pivoted to the lower end of its respective operating link 38 so that the downwardly extending leg 88 of the interposer will be aligned with the upper edge of the bail 36. A spring 90 (Fig. 1) tends to rotate the interposers about their pivot points in a clockwise direction. This will serve to move the downwardly extending leg 88 of the interposer into the path of the bail 36. When such relationship has been established, upward reciprocation of bail 36 will move the linkage mechanism as indicated hereinabove.

Figures 6, 7:
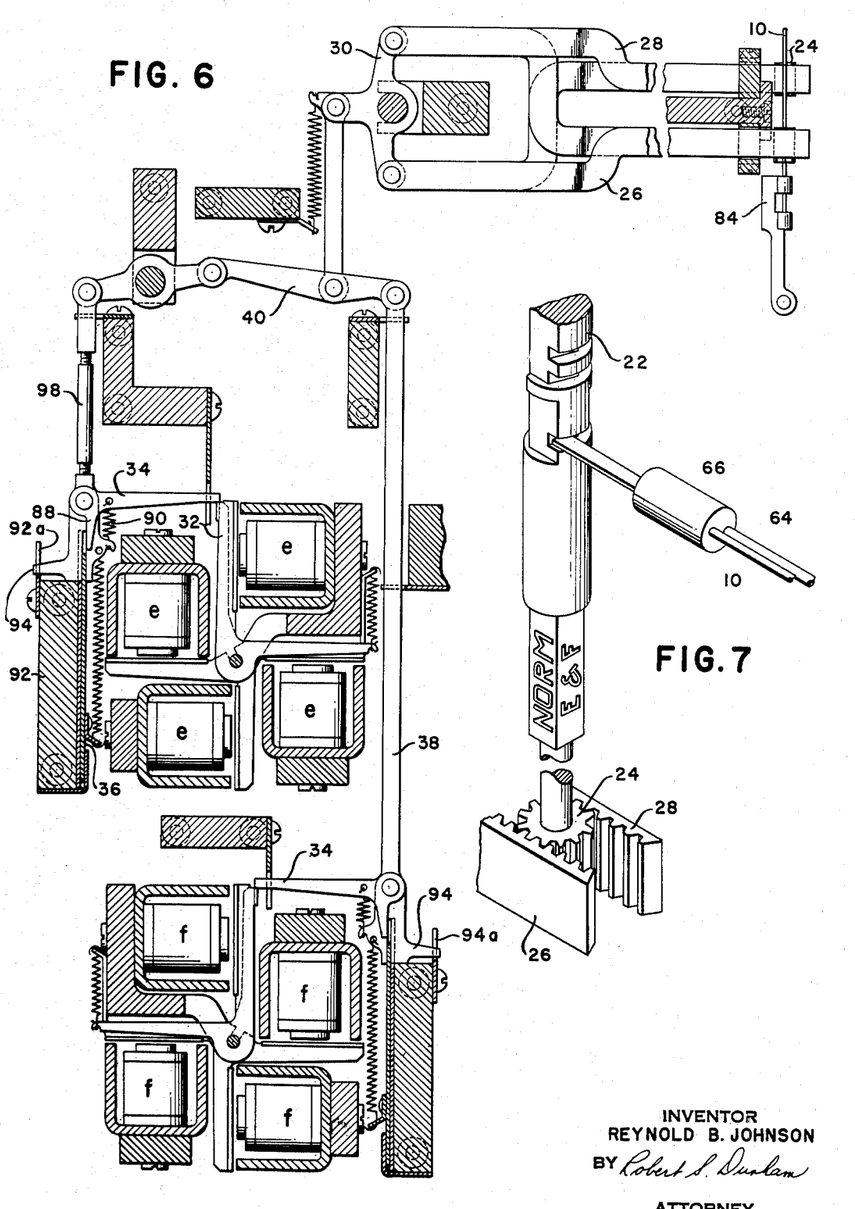
Fig. 6 illustrates the manner in which certain of the wire setting code bar control mechanism may be arranged in a multi-position printer.
Fig. 7 is an enlarged fragmentary view of a wire setting control bar, part of its rotating mechanism, and the end of one form of printing wire.

It may be noted at this point that the operating links 38 are limited in their downward movement by means of stops 92. Furthermore, the lower end of each link 38 is provided with a lateral extension spring 96 which engages in guides 92a (Fig. 6). The abutment 94 has a second laterally projecting portion to which a spring 96 is connected, the other end of the spring being connected to an inturned flange of the operating bail 36. This tends to control the movement of the operating links 38 and their associated code bar adjusting levers. The linkage system may be adjusted by means of a turnbuckle 98.

Figure 5:
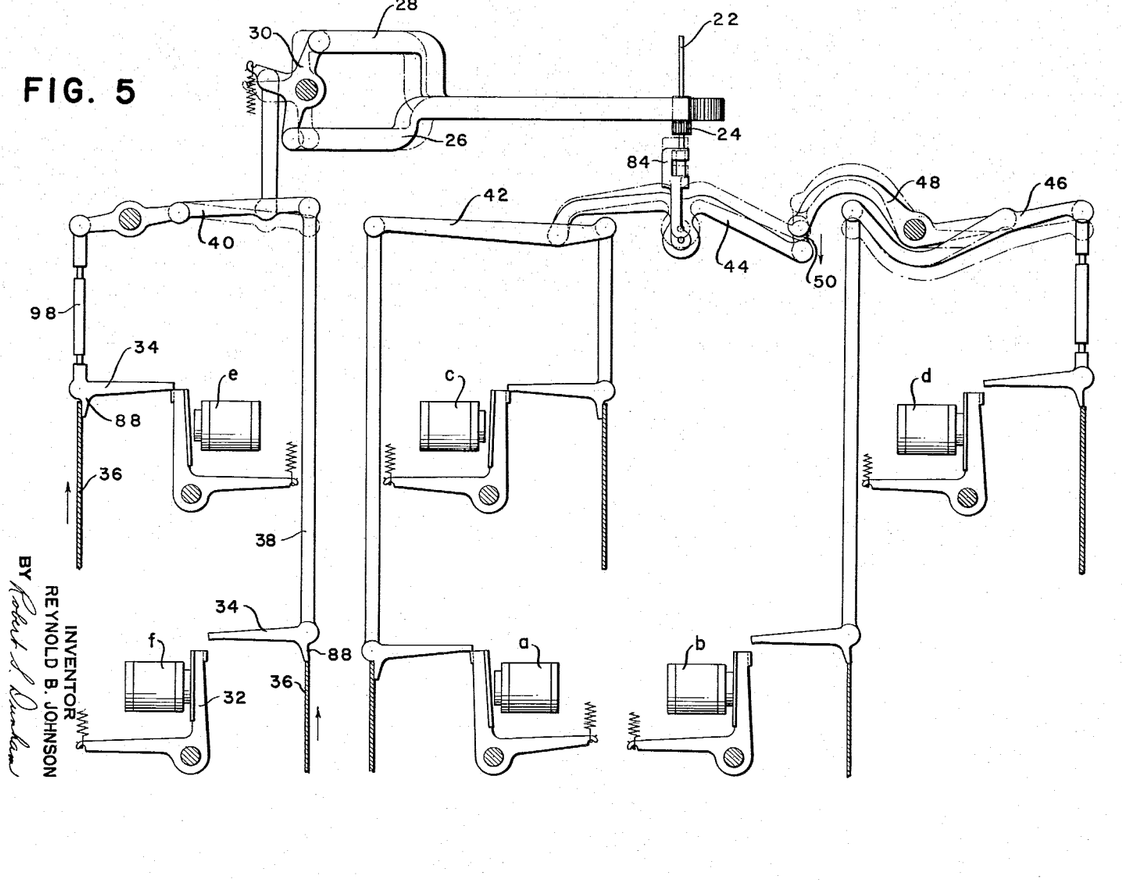
Fig. 5 shows an electro-mechanical wire setting code bar control mechanism with the control linkage displaced as would be required for the letter "M"
Figure 8:
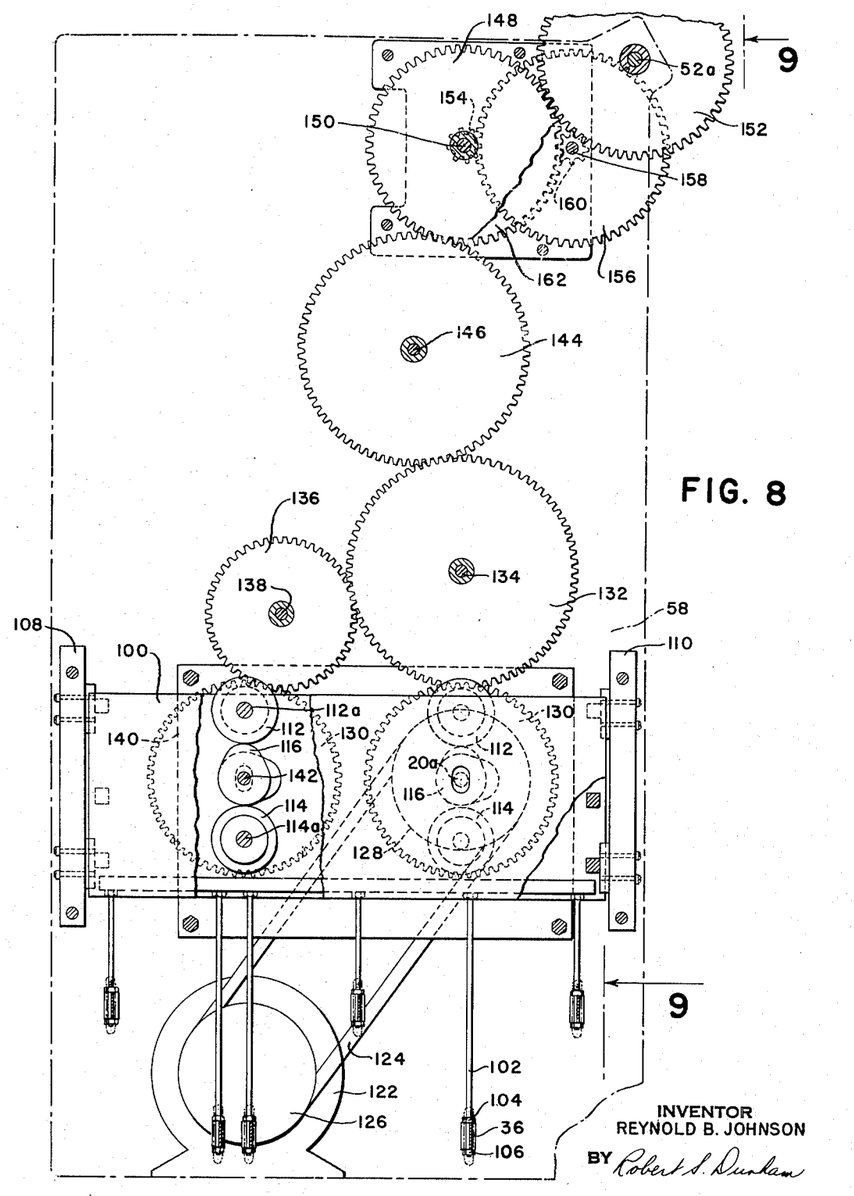
Fig. 8 is an elevational view of the printer along line 8—8 of Fig. 10 and illustrates its drive train, and certain cam actuated control mechanism.

By reference to Fig. 8 of the drawing, it will be seen that the bails 36 are cyclically reciprocated in a horizontal direction, as viewed in that figure, by means of a cam operated plate 100. By reference to Fig. 8 it will be seen that the plate 100 has rigidly attached thereto, by means of shafts 102, six interposers which correspond to the six interposers shown for the magnets in Figs. 1 and 5 of the drawing. Each interposer is adjustably mounted at the free end of its related shaft by means of a pair of nuts 104 and 106. This provides the necessary adjustment in the stroke of the interposer for effecting the proper degree of movement in the differential linkage hereinabove described. The cam-operated plate 100 is mounted for reciprocating movement in a vertical plane by a pair of guides 108 and 110, it being understood that a cam-operated plate 100 is provided at each side of the printer and that the interposer bails 36 are positioned transversely through all printing positions provided in the printer.

By reference to Fig. 8 of the drawing it will be seen that the cam-operated plate 100 has mounted thereon two pairs of cam followers consisting of an upper follower 112 and a lower follower 114. These cam followers are adapted to cooperate with cams 116 which are driven from a printer drive train which is described hereinafter. It may be noted at this point that the cam followers 112 and 114 are mounted respectively on stud shafts 112a and 114a extending laterally from the cam-operated plate 100 while one of the cams 116 is mounted to rotate with a shaft 142 supported in bearings of the side plate 58 and the other is keyed to the eccentric shaft 20a.

It will be seen from the foregoing, therefore, that during each printing cycle the cam plates 100 will be reciprocated through one complete operative movement. As a result the bails 36 will be moved upwardly to engage any of the interposers 34 that may have been released by the impulsing of an associated magnet. On the other hand, if an interposer remains latched by its associated armature 32 because the related magnet has not been energized, the bail 36 related to such interposer passes behind the leg 88 of such interposer without effecting operation thereof.

Figure 11:
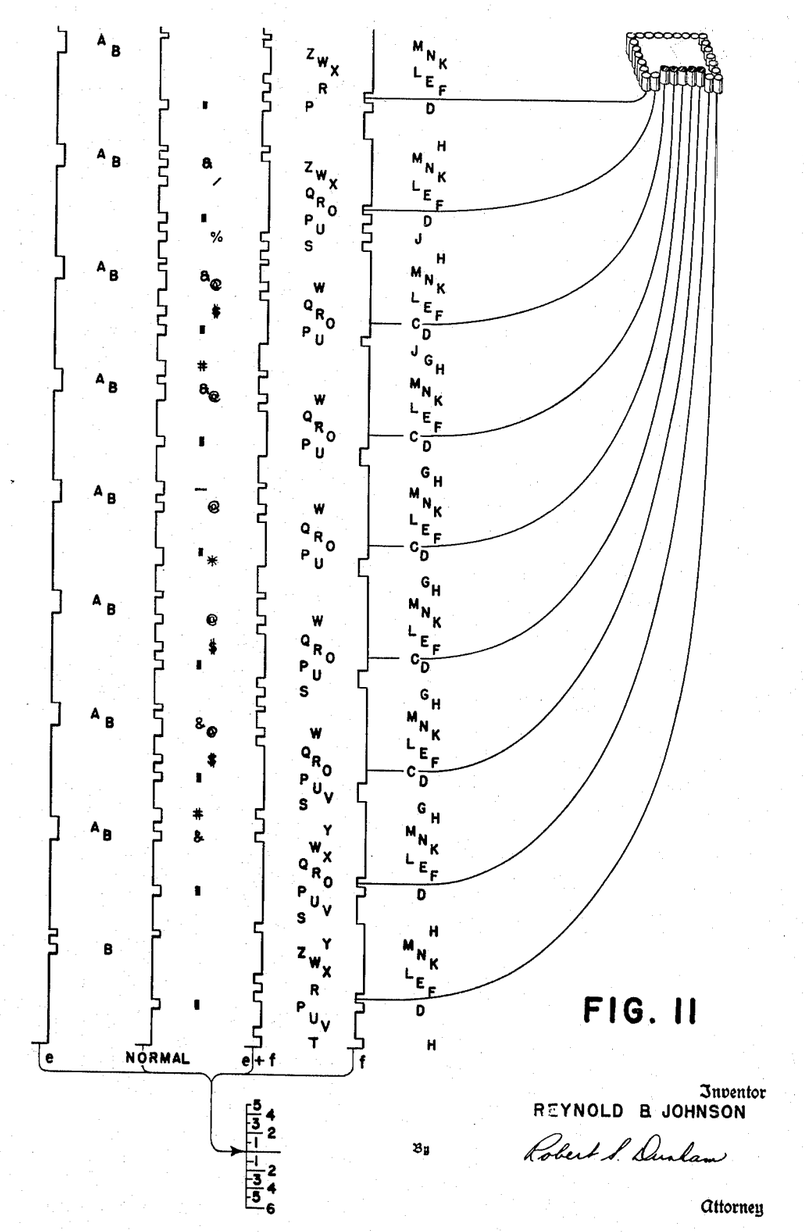
Fig. 11 is a diagrammatic development of a portion of a wire setting control bar, the numerical coding having been omitted to maintain the figure as simple as possible.

With the foregoing in mind it may be appropriate to examine more closely the function of the control magnets *a* through *f*. It has been noted hereinbefore that the code bar 22 is rotated into the four rotational positions thereof by energizing magnets *e* and *f* singly, or *e* and *f* jointly. When magnet *f* is energized, it will rotate the code bar 180° from its normal position at rest and present one of its faces to the control ends 14 of the printing wires 10. When the magnet *e* is energized, it will rotate the code bar 90° from normal in an opposite direction to present a second face of the code bar to the control ends of the printing wires. Finally, when the magnets *e* and *f* are jointly energized, the code bar will be rotated 90° to a fourth position for control of the printing wires. Fig. 11 of the drawing illustrates the four positions of the code bar and these four positions are identified at the bottom of the figure by the same letters used on the rotational indexing magnets. In Fig. 11 of the drawing there has been shown the code bar coding for the letters of the alphabet and for certain special characters, the numerical coding having been omitted to avoid confusion of the figure.

It has also been stated hereinabove that the magnets *a* through *d*, when energized, either singly or in combination with each other, will serve to shift the code bar 22 in a longitudinal direction in order to present to each of the printing wires one of twelve different code zones. In Fig. 11 of the drawing the scale at the bottom of the drawing represents the twelve positions including the normal position into which the code bar may be moved. Each of these positions represents an increment of .020 of an inch. In further considering the manner in which the magnets *a* through *d* must be energized to produce the several longitudinal adjustments, let it be assumed that the scale at the bottom of Fig. 11 represents plus values above the normal position and minus values below the normal position. Furthermore, that each division of the scale represents .020 of an inch. Bearing in mind that energization of magnet *a* will cause the adding lever 44 to move +.040″, that energization of magnet *c* will cause the adding lever to move +.160″, that energization of magnets *a* and *c* jointly will cause the adding lever to move +.200″, that energization of magnet *b* will cause the adding lever to move −.080″, that energization of the magnet *d* will cause the adding lever to move −.160″, and that joint energization of magnets *b* and *d* will cause the adding lever to move −.240″, we may derive the following table showing the combinational energization required for achieving the twelve longitudinal positions of the code bar:

| Position of Code Bar | Amount of Code Bar Movement | Magnets Energized |
| --- | --- | --- |
| 5 | +.100 | a+c |
| 4 | +.080 | c |
| 3 | +.060 | a+b+c |
| 2 | +.040 | c+b |
| 1 | +.020 | a |
| 0 | +.000 | None |
| 1 | −.020 | a+b |
| 2 | −.040 | b |
| 3 | −.060 | a+d |
| 4 | −.080 | d |
| 5 | −.100 | a+b+d |
| 6 | −.120 | b+d |

Figure 12:
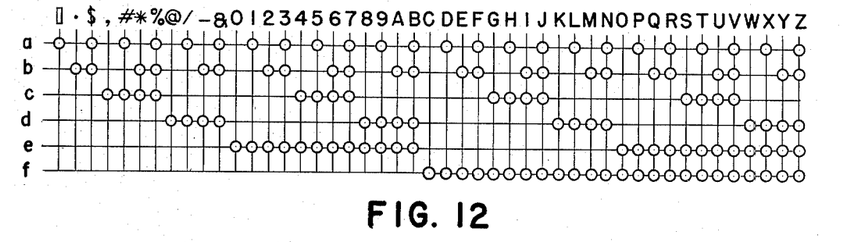
Fig. 12 shows a 6-position code used in the control of the wire setting control bars.
Figure 13:
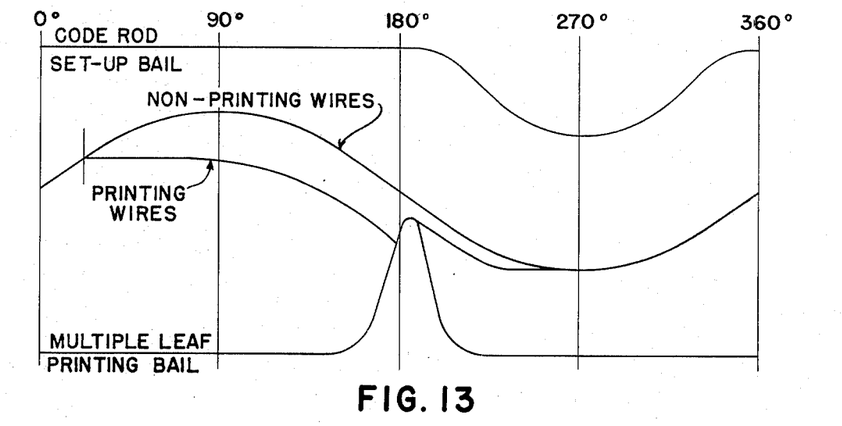
Fig. 13 is a timing diagram.
Figure 14:
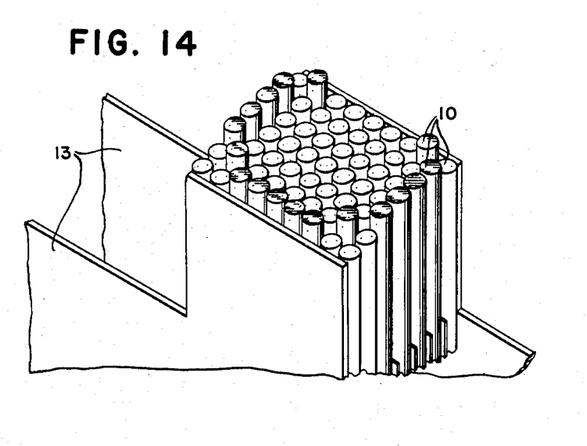
Fig. 14 is an enlarged fragment of a printing wire guide assembly showing the wires at the printing cluster displaced to form a letter "C"
Figure 15:
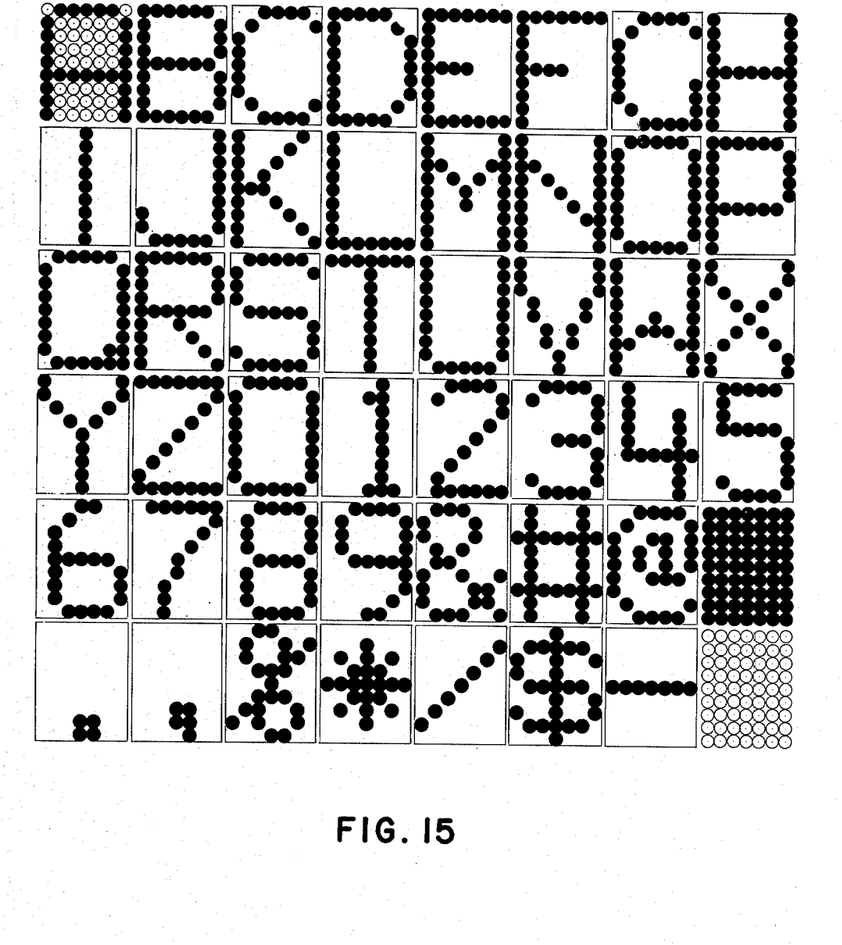
Fig. 15 is a diagram, on an enlarged scale, of the characters adapted to be formed by the wires at a printing position.

From the foregoing it is possible to interpret the code as shown in Fig. 12 that is used for the control of the printer. For example, by reference to that code it will appear that the wires may be set for printing of the letter "C" by energization of the magnet *f*. The magnet *f*, when energized, will rotate the code bar 22 180° from its normal position or into the "f" position as shown in Fig. 11 of the drawing. Since none of the magnets for longitudinal adjustment of the code bar have been energized, it will appear that the code bar is in proper position for forming the letter "C" when it is normal as to longitudinal position but rotated to the "f" position. By inspection of Fig. 11, which represents the position of the code bar for the letter "C," this will appear to be true. By reference to Fig. 15 of the drawing it will be seen that the third, fourth, fifth, sixth and seventh wires in the first vertical column of wires must be projected for the formation of the letter "C." These are the wires projected in the example of Fig. 11.

Similar examples may be followed by reference to the code of Fig. 12. Let it be assumed that a wire cluster is to print the letters "S," "E" and "T" in succession. It will be seen that the code for the letter "S" will energize magnets *c*, *e* and *f*. This will result in rotational indexing of the code bar through 90° from normal into the "*e*"+"*f*" position. It will also result in the longitudinal indexing of the code bar position through a distance of +.080″, which is the fourth position above normal, as seen in Fig. 11. The code for the letter "E" will serve to energize magnets *b* and *f*. Magnet *b* will move the code bar longitudinally through a distance of −.040″ to the second indexing position below normal, as viewed in Fig. 11. The magnet *f* will rotate the code bar through 180° from normal into the "*f*" position. The code for the letter "T" will energize rotational indexing magnets *e* and *f* and also longitudinal indexing magnets *a* and *c*. Energization of magnets *e* and *f* will rotate the code bar 90° from the normal position to the "*e*"+"*f*" position as shown in Fig. 11, while energization of magnets *a* and *c* will move the code bar through +.100″ or to the fifth position above normal, as shown in Fig. 11.

Control of the magnets may be effected through any suitable system for impulsing the magnets according to a six-position code. Herein a simple perforated tape 56 has been illustrated in Fig. 1. Control tape 56 is adapted to feed around a contact roller 118 which is energized from a suitable source of current. The roller 118 is driven in timed relation from the main printer drive train and as perforations in the tape are presented under reading brushes 120, circuits are completed to the respective magnets for rotationally and longitudinally adjusting the code bar 22. It will be observed that six code positions are therefore required for adjusting the code bar 22, and when these positions are used in the proper combination, as set forth in the foregoing description, the code bar will be adjusted for the printing of the forty-eight characters shown in Fig. 15. The specific manner in which the magnets *a* through *f* are energized is a matter of indifference as far as this invention is concerned, and in this respect it may be noted that magnetic tapes, perforated statistical cards and the like are available for the purpose. It would be easy to translate the twelve positional code used in punched statistical cards into a six-position code for the control of a printer such as that shown herein, and it is deemed unnecessary to show how such translation may be effected since it is well within the skill of those skilled in the art.

Figure 9A:
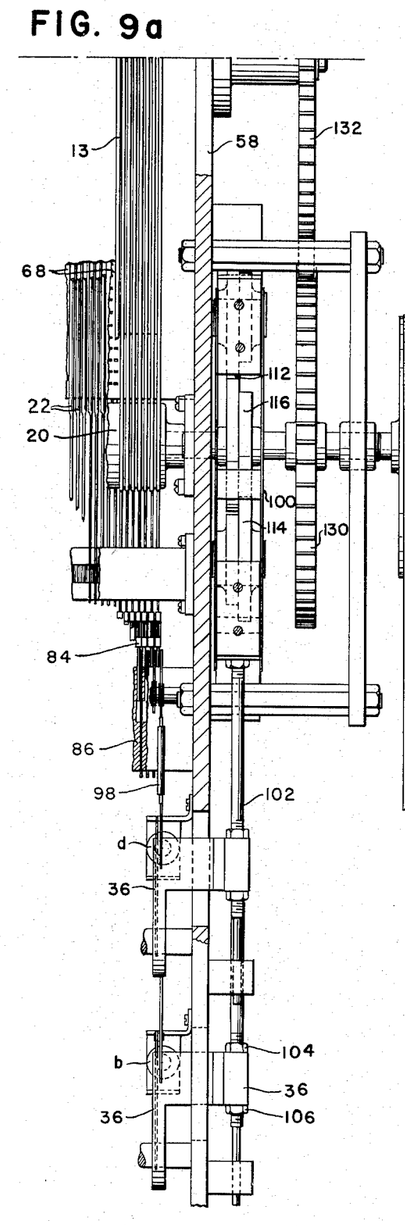
Figs. 9a and 9b together are an enlarged view taken from the line 9—9 of Fig. 8.
Figure 9B:
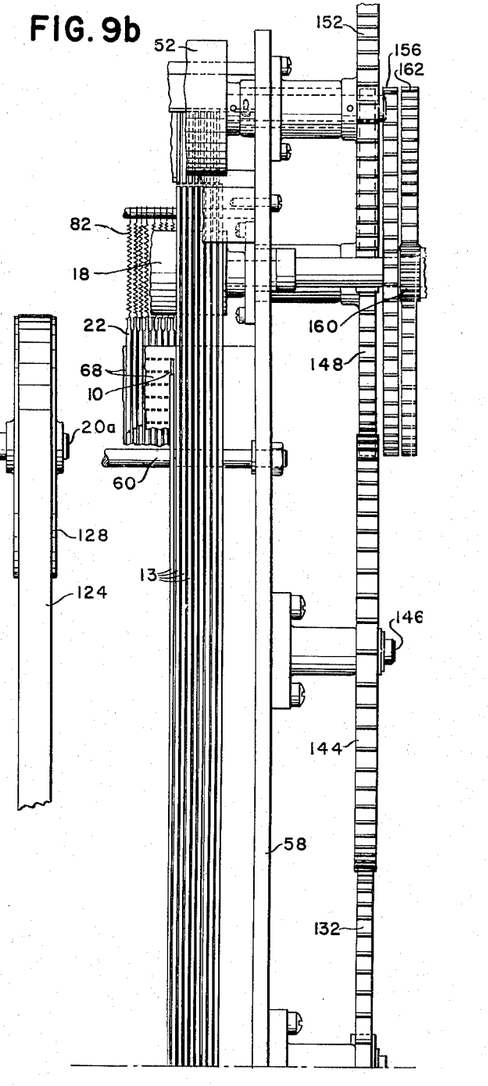

One of the difficulties in designing wire printers adapted to print an entire line in a single cycle lies in the fact that so little space is available at each letter position for the printing wires and the necessary controls therefor. It has been pointed out hereinabove that the wire guide assemblies 13, by virtue of the arrangement of the wires therein, result in a structure of thin, wafer-like form so that a plurality of such wire guide assemblies may be positioned side-by-side to provide letter positions for an entire line of printing. Herein the design permits ten letter positions per inch, and consequently as many of the wire guide assemblies are placed side-by-side and fixed in position as may be required for a full line of printing. It is to be understood that each of the wire guide assemblies will have associated therewith a wire control bail 16, and in the organization of a plurality of such wire guide assemblies to constitute a plurality of printing positions, the eccentrics 18 and 20 constitute common operating members for any number of wire control bails that may be required in the printer. Figs. 9a and 9b illustrate a printer having a plurality of letter positions therein, this particular illustration being of the form wherein the control ends 14 of the wires themselves are moved into contact with stationary code rods 22. Fig. 4 of the drawing shows a plurality of wire guide assemblies 13 arranged for the printing of a complete line according to that form of the invention in which the code rods are moved into contact with the control ends of the wires for the setting thereof.

When a multiplicity of wire guide assemblies 13 are used in a line printer, the arrangement of the control magnets a through f requires special treatment. In such case the magnets are arranged in groups of four such as shown in Fig. 6 of the drawing. By reference to Fig. 6 of the drawing it will be seen that a group of four e magnets constitute a magnet assembly for the control of four letter positions. By the same token the magnets f are arranged in groups of four for the control of four letter positions. In such grouped arrangement of the control magnets, the differential linkage is the same as that heretofore described. The essential difference exists in the form of the magnet armatures whereby four such armatures have their latching ends extending upwardly into blocking relation to the related interposers.

The drive for the printer is best shown in Figs. 8, 9a, 9b and 10. The entire drive train is illustrated in Fig. 8 of the drawing to which attention is now directed. Power for driving the printer is derived from any suitable source such as an electric motor 122. A drive belt 124 is trained from the motor drive wheel 126 to a drive wheel 128, keyed to the end of the eccentric shaft 20a, this being the shaft on which the eccentric 20 and the first cam 116 are mounted. Rotating with the cam shaft is a gear 130, the teeth of which engage an idler gear 132 mounted for rotation on a stub shaft 134. The idler gear 132 engages the teeth of a second idler gear 136 mounted for rotation on a stub shaft 138. The teeth of the idler gear 136 are in turn in driving contact with the teeth of a drive gear 140 attached to the end of the shaft 142 which is the shaft on which the second cam 116 is mounted.

The foregoing drive is sufficient to impart cyclic reciprocation to the cam-operated plate 100 which in turn carries with it the bails 36. Furthermore, drive is thereby imparted to the wire control bail eccentric 20.

The idler gear 136 is in driving contact with an intermediate idler gear 144, mounted for rotation on a stub shaft 146. The intermediate idler gear 144 drives an eccentric shaft drive gear 148, the gear 148 being fixed to an eccentric shaft 150 on which the upper wire control bail eccentric 18 is mounted.

Figure 10:
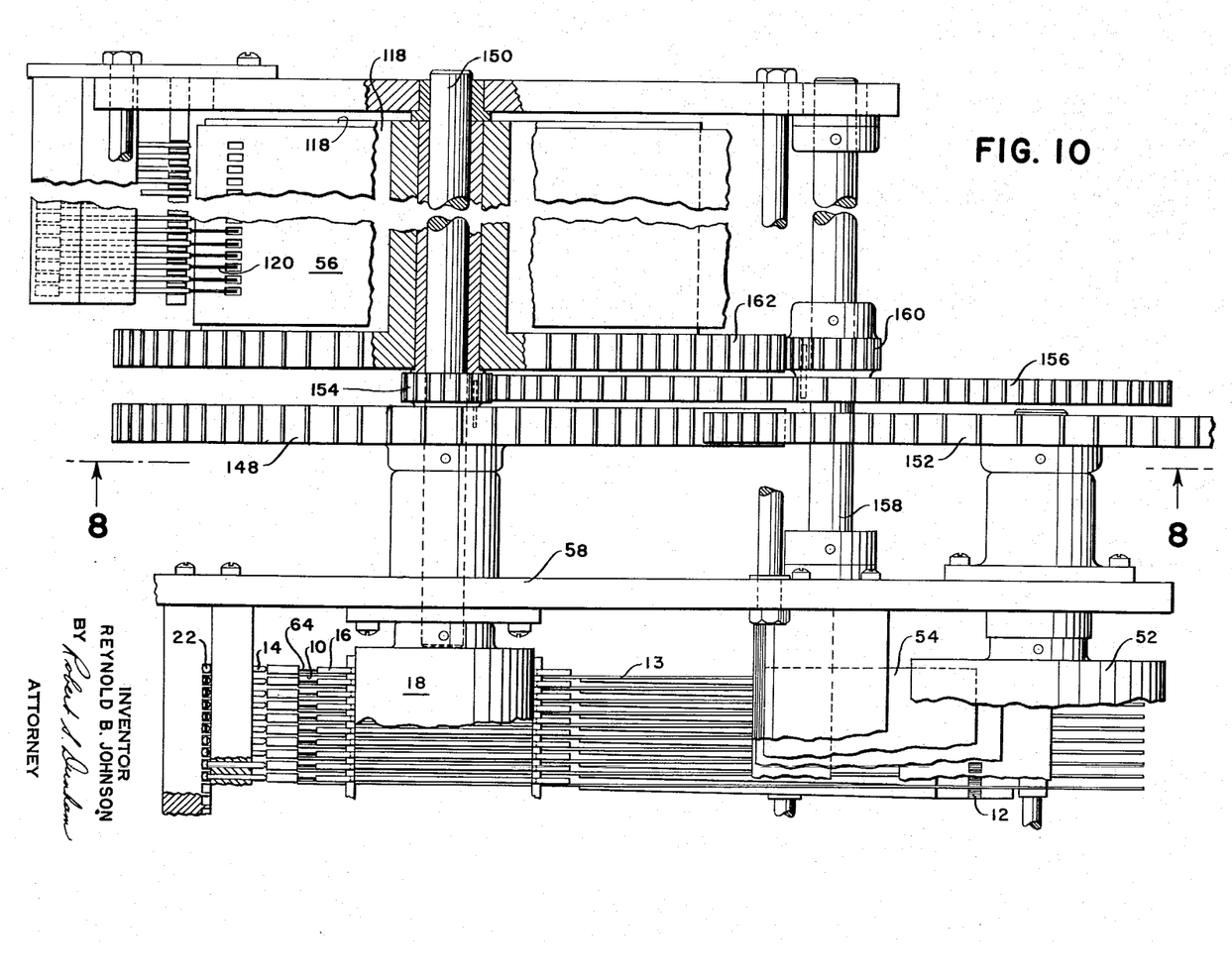
Fig. 10 is a plan view of the printer.

The drive through the remaining gears of the train is best followed by reference to Fig. 10 of the drawing wherein it is seen that the eccentric shaft drive gear 148 is in driving contact with a print cam shaft gear 152, this latter gear driving the shaft which carries the print cam 52. Attached for rotation with the eccentric shaft drive gear 148 is a pinion 154 mounted on the eccentric shaft 150 for free rotation in respect thereto. The pinion 154 in turn is in driving contact with a reader drive gear 156, the reader drive gear 156 being mounted for rotation of shaft 158. The reader drive gear 156 is, in effect, a compound gear in that it is coupled for rotation with a pinion 160. The pinion 160 has driving engagement with a reader gear 162, to which the contact roll 118 is attached. The gear 162 and the contact roll 118 are mounted for free rotation on the eccentric shaft 150, and the gear ratio between the pinion 160 and the gear 162 is such that the contact roll 118 is advanced one reading position during each printing cycle.

The specific dimensions referred to in this specification are by way of example for the purpose of rendering the description of the invention as definite as possible. All of these dimensions may be changed as circumstances may dictate without in any manner departing from the essence of the invention. The principle of the invention has been set forth to permit its application to a variety of physical embodiments, and one concrete embodiment, together with a modification thereof, has been described by way of example. Having thus described the invention, the scope of the same will be defined in the following claims.

I claim:

1. In a wire printer, means for confining a cluster of wires at one end thereof to a letter printing area, a wire guide member adapted to support printing wires therein for free longitudinal movement relative to each other, printing wires in said guide member, said wires terminating at one end in a plane at said confining means to constitute a printing face and being arranged remote therefrom in a plane constituting a wire setting zone, a wire setting device in said wire setting zone, means for moving said setting device and the wires at said wire setting zone into contact with each other for differentially adjusting the longitudinal position of setting device selected wires to form a printing character at said printing face, means for separating said setting device and said wires at said wire setting zone after selected wires have been set to form a letter but before a printing operation thereby freeing said wires for longitudinal movement under impact at the printing face thereof, and means thereafter operative to print by impact from a printing face so set up.

2. In a wire printer, means for confining a cluster of wires at one end thereof to a letter printing area, a wire guide member adapted to support printing wires therein for free longitudinal movement relative to each other, printing wires in said guide member, said wires terminating at one end in a plane at said confining means to constitute a printing face and at the other ends thereof in a plane constituting a wire setting zone, a wire setting device in said wire setting zone, means for moving said setting device and the wire ends at said wire setting zone into contact with each other for differentially adjusting the longitudinal position of setting device selected wires to form a printing character at said printing face, means for separating said setting device and said last named wire ends after selected wires have been set to form a letter but before a printing operation thereby freeing said wires for longitudinal movement under impact at the printing face thereof, and means thereafter operative to print by impact from a printing face so set up.

3. In a wire printer, means for confining a cluster of wires at one end thereof to a letter printing area, a wire guide member adapted to support printing wires therein for substantially free longitudinal movement relative to each other, printing wires in said guide member, said wires terminating at one end in a plane at said confining means to constitute a printing face and at the other ends thereof in a plane constituting a wire setting zone, friction means operative on said wires for limiting the freedom of their movement in a longitudinal direction, a wire setting device in said wire setting zone, means for moving said setting device and the wire ends at said wire setting zone into contact with each other for differentially adjusting the longitudinal position of setting device selected wires to form a printing character at said printing face, means for separating said setting device and said last named wire ends after selected wires have been set to form a letter but before a printing operation thereby freeing said wires for longitudinal movement under impact at the printing face thereof, and means thereafter operative to print by impact from a printing face so set up.

4. In a wire printer, means for confining a cluster of wires at one end thereof to a letter printing area, a wire guide member adapted to support printing wires therein for free longitudinal movement relative to each other, printing wires in said guide member, said wires terminating at one end in a plane at said confining means to constitute a printing face and at the other ends thereof in a plane constituting a wire setting zone, an inertia weight attached to each of said wires, a wire setting device in said wire setting zone, means for moving said setting device and the wire ends at said wire setting zone into contact with each other for differentially adjusting the longitudinal position of setting device selected wires to form a printing character at said printing face, means for separating said setting device and said last named wire ends after selected wires have been set to form a letter but before a printing operation thereby freeing said wires for longitudinal movement under impact at the printing face thereof, and means thereafter operative to print by impact from a printing face so set up.

5. In a multiple character wire printer, means for confining a cluster of wires at one end thereof to a letter printing area, a wire supporting member having an edge remote from said confining means, a plurality of wire guides in said supporting member extending from said confining means to a position of alignment at said remote edge of said supporting member, a wire in each of said guides, said wires having aligned ends at said confining means to provide a printing surface and having their opposite ends protruding from the aligned wire guides at the remote edge of said support, a rotatable code bar having a plurality of angularly displaced wire setting faces thereon, means for selectively rotating said code bar to register a selected wire setting face thereon with the protruding ends of said wires, and means for moving said protruding ends of said wires and said selected wire setting face into contact with each other for differentially adjusting the longitudinal position of selected ones of said wires to form a printing character at said printing surface.

6. In a multiple character wire printer, means for confining a cluster of wires at one end thereof to a letter printing area, a wire supporting member having an edge remote from said confining means, a plurality of wire guides in said supporting member extending from said confining means to a position of alignment at said remote edge of said supporting member, a wire in each of said guides, said wires having aligned ends at said confining means to provide a printing surface and having their opposite ends protruding from the aligned wire guides at the remote edge of said support, a rotatable code bar having a plurality of angularly displaced wire setting faces thereon, electro-magnetic means for selectively rotating said code bar to register a selected wire setting face thereon with the protruding ends of said wires, and means for moving said protruding ends of said wires and said selected wire setting face into contact with each other for differentially adjusting the longitudinal position of selected ones of said wires to form a printing character at said printing surface.

7. In a multiple character wire printer, means for confining a cluster of wires at one end thereof to a letter printing area, a wire supporting member having an edge remote from said confining means, a plurality of wire guides in said supporting member extending from said confining means to a position of single line alignment at said remote edge of said supporting member, a wire in each of said guides, said wires having aligned ends at said confining means to provide a printing surface and having their opposite ends protruding from the aligned wire guides at the remote edge of said support, an elongated code bar mounted for longitudinal movement and having a plurality of longitudinally displaced wire setting faces thereon, means for selectively adjusting the longitudinal position of said code bar to register a selected wire setting face thereon with the protruding ends of said wires, and means for moving said protruding ends of said wires and said selected wire setting face into contact with each other for differentially adjusting the longitudinal position of selected ones of said wires to form a printing character at said printing surface.

8. In a multiple character wire printer, means for confining a cluster of wires at one end thereof to a letter printing area, a wire supporting member having an edge remote from said confining means, a plurality of wire guides in said supporting member extending from said confining means to a position of alignment at said remote edge of said supporting member, a wire in each of said guides, said wires having aligned ends at said confining means to provide a printing surface and having their opposite ends protruding from the aligned wire guides at the remote edge of said support, an elongated code bar mounted for rotational and longitudinal movement and having a plurality of angularly and longitudinally displaced wire setting faces thereon, means for selectively rotating said code bar to register a selected angularly displaced wire setting face thereon with the protruding ends of said wires, means for selectively adjusting the longitudinal position of said code bar to register a selected longitudinally displaced wire setting face thereon with the protruding ends of said wires, and means for moving said protruding ends of said wires and said selected wire setting face into contact with each other for differentially adjusting the longitudinal position of selected ones of said wires to form a printing character at said printing surface.

9. In a multiple character wire printer, means for confining a cluster of wires at one end thereof to a letter printing area, a wire supporting member having an edge remote from said confining means, a plurality of wire guides in said supporting member extending from said confining means to a position of alignment at said remote edge of said supporting member, a wire in each of said guides, said wires having aligned ends at said confining means to provide a printing surface and having their opposite ends protruding from the aligned wire guides at the remote edge of said support, an elongated code bar mounted for rotational and longitudinal movement and having a plurality of angularly and longitudinally displaced wire setting faces thereon, electro-magnetic means for selectively rotating said code bar to register a selected angularly displaced wire setting face thereon with the protruding ends of said wires, electro-magnetic means for selectively adjusting the longitudinal position of said code bar to register a selected longitudinally displaced wire setting face thereon with the protruding ends of said wires, and means for moving said protruding ends of said wires and said selected wire setting face into contact with each other for differentially adjusting the longitudinal position of selected ones of said wires to form a printing character at said printing surface.

10. A multiple character printer comprising a plurality of wire guide members, means for supporting said wire guides in close proximity to each other, a plurality of printing wires in each of said guide members extending therein from a cluster at a common printing zone to a protruding position of single line alignment remote from said printing zone, means for differentially adjusting the longitudinal position of selected ones of said wires in each of said guide members to form a printing character comprising a separate elongated code bar associated with each protruding line of wires, and a common bail for simultaneously moving said code bars and said wires into contact with each other to render said code bars effective to adjust the longitudinal position of selected wires to form a plurality of aligned printing faces at said common printing zone.

11. A multiple character printer comprising a plurality of wire guide members, means for supporting said wire guides in close proximity to each other, a plurality of printing wires in each of said guide members extending therein from a cluster at a common printing zone to a protruding position of single line alignment remote from said printing zone, means for differentially adjusting the longitudinal position of selected ones of said wires in each of said guide members to form a printing character comprising a separate elongated code bar associated with each protruding line of wires, and a common bail for simultaneously moving said code bars against the protruding ends of said wires to render said code bars effective to adjust the longitudinal position of selected wires to form a plurality of aligned printing faces at said common printing zone.

12. A multiple character printer comprising a plurality of wire guide members, means for supporting said wire guides in close proximity to each other, a plurality of printing wires in each of said guide members extending therein from a cluster at a common printing zone to a protruding position of single line alignment remote from said printing zone, means for differentially adjusting the longitudinal position of selected ones of said wires in each of said guide members to form a printing character comprising a separate elongated code bar associated with each protruding line of wires, and a common bail for simultaneously moving the protruding ends of said wires into contact with said code bars to render said code bars effective to adjust the longitudinal position of selected wires to form a plurality of aligned printing faces at said common printing zone.

13. In a wire printer, means for confining a cluster of wires at one end thereof to a letter printing area, a wire guide member adapted to support printing wires therein for free longitudinal movement relative to each other, printing wires in said guide member, said wires terminating at one end in a plane at said confining means to constitute a printing face and being arranged remote therefrom in a plane constituting a wire setting zone, a wire setting device in said wire setting zone, means for moving said wire setting means into contact with the wire ends at said wire setting zone for differentially adjusting the longitudinal position of setting device selected wires to form a printing character at said printing face, means for separating said setting device and said wires at said wire setting zone after selected wires have been set to form a letter but before a printing operation thereby freeing said wires for longitudinal movement under impact at the printing face thereof, and means thereafter operative to print by impact from a printing face so set up.

14. In a wire printer, means for confining a cluster of wires at one end thereof to a letter printing area, a wire guide member adapted to support printing wires therein for free longitudinal movement relative to each other, printing wires in said guide member, said wires terminating at one end in a plane at said confining means to constitute a printing face and being arranged remote therefrom in a plane constituting a wire setting zone, a wire setting device in said wire setting zone, means for moving the ends of said wires at said wire setting zone into contact with said wire setting device for differentially adjusting the longitudinal position of said setting device selected wires to form a printing character at said printing face, means for separating said setting device and said wires at said wire setting zone after selected wires have been set to form a letter but before a printing operation thereby freeing said wires for longitudinal movement under impact at the printing face thereof, and means thereafter operative to print by impact from a printing face so set up.

15. In a wire printer, means adapted to guide a group of printing wires therein for free longitudinal movement relative to each other, printing wires in said guide means, said wires terminating at one end in a printing face and the ends remote therefrom being arranged in a wire setting zone, a wire setting device in said wire setting zone, means for moving said setting device and the wires at said wire setting zone into contact with each other for differentially adjusting the longitudinal position of setting device selected wires to form a printing character at said printing face and for separating said setting device and wires at said wire setting zone after selected wires have been set to form a letter but before a printing operation, thereby freeing said wires for longitudinal movement under impact at the printing face thereof, and means thereafter operative to cause impact between a record medium and the printing face of set up wires.

16. In a machine wherein printing is effected by relative movement between a record medium and the group ends of a plurality of printing wires, a plurality of printing wires, means for confining one end of said printing wires to a printing face, a wire setting device, means for supporting the other ends of said wires adjacent said wire setting device, means for guiding said wires between said printing face and said wire setting device to prevent deflection thereof under the influence of endwise forces, means for first moving the setting ends of said wires and said setting device into contact with each other to effect selective axial displacement of the printing wires relative to each other and for thereafter separating said wire ends and said setting device whereby said set up wires are free to move in an axial direction, and means thereafter operative to effect relative movement between the record medium and the printing face in order to print.

References Cited in the file of this patent
UNITED STATES PATENTS

| | | |
|---|---|---|
| 1,028,037 | Lilleberg | May 28, 1912 |
| 1,139,972 | Henschel et al. | May 18, 1915 |
| 1,527,768 | Anning | Feb. 24, 1925 |
| 2,129,065 | Loop | Sept. 6, 1938 |
| 2,353,083 | Roth | July 4, 1944 |
| 2,524,127 | Johnson | Oct. 3, 1951 |
| 2,575,017 | Hunt | Nov. 13, 1951 |
| 2,632,386 | Hyland | Mar. 24, 1953 |